United States Patent
Thornton

(10) Patent No.: US 6,633,934 B1
(45) Date of Patent: Oct. 14, 2003

(54) COMPUTER SYSTEM HAVING REDUCED CABLING REQUIREMENTS

(75) Inventor: Barry Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 0 days.

(21) Appl. No.: 09/349,691

(22) Filed: Jul. 8, 1999

Related U.S. Application Data
(60) Provisional application No. 60/091,985, filed on Jul. 8, 1998.

(51) Int. Cl.[7] ............................................. G06F 13/00
(52) U.S. Cl. ........................ 710/100; 710/62; 345/156; 725/133
(58) Field of Search ........................... 710/100, 62, 63, 710/69, 70, 72, 73, 300, 305; 345/156; 725/133, 141, 153, 80; 348/522, 465

(56) References Cited

U.S. PATENT DOCUMENTS

| | | | |
|---|---|---|---|
| 4,941,845 A | | 7/1990 | Eppley et al. |
| 4,972,470 A | | 11/1990 | Farago |
| 5,262,860 A | * | 11/1993 | Fitzpatrick et al. ......... 348/461 |
| 5,330,370 A | | 7/1994 | Reddersen et al. |
| 5,333,271 A | | 7/1994 | Fredericks et al. |
| 5,367,646 A | | 11/1994 | Pardillos et al. |
| 5,448,697 A | * | 9/1995 | Parks et al. .................. 345/520 |
| 5,488,105 A | | 1/1996 | Uno et al. |
| 5,488,705 A | | 1/1996 | LaBarbera |
| 5,537,558 A | | 7/1996 | Fletcher et al. |
| 5,615,344 A | | 3/1997 | Corder |
| 5,724,103 A | * | 3/1998 | Batchelor ................... 348/553 |
| 5,727,184 A | | 3/1998 | Richter et al. |
| 5,913,072 A | * | 6/1999 | Wieringa ..................... 710/12 |
| 5,938,770 A | * | 8/1999 | Kim ........................... 713/300 |
| 5,969,750 A | * | 10/1999 | Hsieh et al. ................ 348/14.1 |
| 5,987,106 A | * | 11/1999 | Kitamura ............... 379/110.01 |
| 5,995,150 A | * | 11/1999 | Hsieh et al. ........... 375/240.12 |
| 6,012,101 A | * | 1/2000 | Heller et al. ................. 709/250 |
| 6,038,616 A | * | 3/2000 | Thornton et al. .............. 710/2 |
| 6,055,023 A | * | 4/2000 | Rumreich et al. ........... 348/553 |
| 6,084,638 A | * | 7/2000 | Hare et al. ................... 348/552 |
| 6,119,146 A | * | 9/2000 | Heller et al. ................. 709/203 |
| 6,212,584 B1 | * | 4/2001 | Nei .............................. 710/72 |
| 6,314,479 B1 | * | 11/2001 | Frederick et al. ............. 710/63 |
| 6,320,576 B1 | * | 11/2001 | Kim ........................... 345/214 |
| 6,385,666 B1 | * | 5/2002 | Thornton et al. .............. 710/2 |

OTHER PUBLICATIONS

Philips' "USB Taking off as the industry rolls out monitors with hubs" press release (http://www.semiconductors.philips.com/news/content/file_189.html).*
CNET's "Apple's new consumer Macintosh" article (http://news. cnet.com/news/0_1003-200-329060.html).*
*Universal Serial Bus Specification Manual*, (Compaq, Intel, Microsoft, NEC), Revision 1.1, Sep. 23, 1998.

* cited by examiner

Primary Examiner—Sumati Lefkowitz
Assistant Examiner—X. Chung-Trans
(74) Attorney, Agent, or Firm—Meyertons Hood Kivlin Kowert & Goetzel, P.C.; Jeffrey C. Hood

(57) ABSTRACT

A computing system and a human interface for the computing system. A first cable couples the computing system to a video monitor of the human interface, a second cable couples the video monitor to a keyboard of the human interface, a third cable couples the video monitor to a mouse of the human interface, a fourth cable couples the video monitor to a printer of the human interface, a fifth cable couples the video monitor to speakers of the human interface, a sixth cable couples the video monitor to a telephone of the human interface and a seventh cable couples the video monitor to a USB device of the human interface. The computing system propagates data for the various I/O device to the video monitor over the first cable and the video monitor propagates the data for the various I/O devices over respective ones of the second through seventh cables.

21 Claims, 4 Drawing Sheets

COMPUTER SYSTEM HAVING REDUCED CABLING REQUIREMENTS

CROSS-REFERENCE TO RELATED PROVISIONAL APPLICATION

This application claims the benefit of U.S. Provisional Patent Application Ser. No. 60/091,985 filed on Jul. 8, 1998.

CROSS-REFERENCE TO RELATED APPLICATION

This application is related to U.S. patent application Ser. No. 09/349,685 abandoned entitled "Video Monitor having an Input/Output Device Interface Board Incorporated Therein" filed on even date herewith and hereby incorporated by reference as if reproduced in its entirety.

TECHNICAL FIELD

The invention relates generally to a computer system comprised of a computing system and a human interface and, more particularly, to a computer system having a single cable coupling the computing system and a video monitor configured to serve as an interface between the computing system and the remaining devices forming part of the human interface.

BACKGROUND OF THE INVENTION

The components of all computer systems, including personal computers (or "PCS"), minicomputers and mainframes, may be divided into two functional units—the computing system and the human interface to the computing system. For a PC, the computing system is, very simply, the chassis which holds the processor subsystem (typically, a microprocessor residing on a processor board commonly referred to as a "motherboard"), power supply, hard drive and the like. The human interface, on the other hand, are those devices that humans used to transfer information to and/or receive information from the computing system. The most commonly recognized devices which form part of the human interface with the computing system include the monitor, keyboard, mouse and printer. Of course, a variety of other devices, for example, a speaker system, joystick, trackball, touchpad or others too numerous to specifically mention, may form part of the human interface. Finally, while not traditionally viewed as a device which serves as a human interface to a computing system, the convergence of telephony and computing technologies has led to a variety of applications where it has proven useful for using the computing system as an interface between a telecommunications terminal, for example, a telephone, and a telecommunications network such as the public switched telephone network (or "PSTN").

In conventionally configured computer systems, multiple cables, one for each device forming part of the human interface, are used to couple the computing system and the human interface. Typically, there are four distinct and separate cables—the monitor cable, the keyboard cable, the mouse cable and the printer cable—required to connect the human interface devices to the computing system. Each of the cables is a different style and has a different stiffness. Furthermore, each cable typically has a different length as well. As a result, attaching the cables between the human interface and the computing system represents a complex routing and connection activity. Oftentimes, the length of the shortest cable restricts convenient placement of the computing system with respect to the various devices which collectively comprise the human interface.

In the past, restrictions in the placement of the various ones of the devices which form part of the human interface have been addressed by simply lengthening the cable thereof. This solution both ignores the problem and degrades performance. Increasing the length of the cable does deal with the distance issues at the cost of degrading performance. Specifically, the combination of additional connectors and increased cable loading affects the performance of the individual cables and respective electrical signals. There are, though, several cables, each of a different diameter and stiffness, all of which contribute to the overall complexity of the installation.

While not believed to be prior art to the present application, a universal serial bus (or "USB") architectural configuration for a desktop computer environment was disclosed in Universal Serial Bus Specification, revision 1.1, page 23 (Sep. 23, 1998). The disclosed architectural configuration includes a PC operating as a host/hub, a telephone function and a monitor hub/function coupled to the PC, microphone and speaker functions and a keyboard host/function coupled to the monitor hub/function and mouse and pen functions coupled to the keyboard hub/function. To have a combination of a hub/function and one or more functions coupled thereto, the monitor hub/function must be equipped with a variety of USB control circuitry, including a USB host controller capable of controlling 12 Mbs serial data transfers using a USB protocol which involves the transfer of data packets having endpoint addresses which identify the destination of the data packets transferred over a single twisted-par of wires and a hub repeater for propagating data packets destined to functions coupled to other hubs or hub/functions. Thus, the disclosed desktop configuration requires a variety of the devices, including the monitor and keyboard, to be equipped with sophisticated USB control circuitry. Furthermore, due to technical limitations, data transmissions using USB cables are limited to lengths of about 16 feet without the use of additional hubs or about 99 feet if 5 USB hubs are connected in series.

It is, therefore, the purpose of the invention to reduce and simplify the cabling and associated interconnection interface between a computing system, whether PC, mini or mainframe, and an associated human interface, typically, a keyboard, mouse, printer, telephone, speaker system and video monitor.

SUMMARY OF THE INVENTION

In one embodiment, the present invention is of a computer comprised of a computing system and a human interface for the computing system. A first cable couples the computing system to a video monitor of the human interface and a second cable couples the video monitor to a first I/O device of the human interface. The computing system propagates data for the first I/O device to the video monitor over the first cable and the video monitor propagates the data for the first I/O device, received over the first cable, to the first I/O device over the second cable. In one aspect thereof, the computer further includes a first interface board having a combine circuit, at least two lines connected to the computing system and at least one line connected to the first cable. The first interface board receives a video signal from the computing system over a first one of the lines and receives a data signal from the computing system over a second one of the lines. The combine circuit combines the received video and data signals to produce a combined video/data signal. The combined video/data signal is propagated to the video monitor over the first cable. In another aspect thereof, the video monitor further includes a display circuit and a second interface board having a separator circuit, at least one line connected to the first cable, at least one line connected to the display circuit and at least one line connected to the second cable. The second interface board receives the combined video/data signal from the first interface board over the first cable. There, the separator circuit separates the combined video/data signal into the video signal and the data signal. The video signal is then propagated to the display circuit while the data signal is propagated to the first I/O device over the second cable.

In further aspects thereof, the human interface further includes a second I/O device. A third cable couples the second I/O device to the video monitor. In this aspect, the first interface board includes a combining circuit which combines first and second data signals received from said computing system into a combined data signal and a second combining circuit which combines the combined data signal and the video signal into a combined video data signal for propagation to the video monitor over the first cable. The second interface board may include a first separator circuit which separates the received combined video/data signal into the video and combined data signals and a second separator circuit which separates the combined data signal into the first and second data signals. The video signal is propagated to a display circuit of the video monitor, the first data signal is propagated from the video monitor to the first I/O device over the second cable and the second data signal is propagated from the video monitor to the second I/O device over the third cable.

In another embodiment, the present invention is of a computer comprised of a computer chassis, a computing system supportably mounted within the computer chassis, a video monitor chassis, a video display system supportably mounted within the video monitor chassis, a keyboard and a mouse. A first cable connects an access port on an exterior side surface of the computer chassis to a first access port on an exterior side surface of the video monitor chassis. A second cable connects a second access port on the exterior side surface of the video monitor chassis to the keyboard and a third cable connects a third access port on the exterior side surface of the video monitor to the mouse. The computing system and the keyboard exchange keyboard data via the first access port on the exterior side surface of the computer chassis, the first cable, the first access port on the exterior side surface of the video monitor chassis, the video display system, the second access port on the exterior side surface of the video monitor chassis and the second cable. The computing system and the mouse exchange mouse data via the first access port on the exterior side surface of the video monitor chassis, the first cable, the first access port on the exterior side surface of the video monitor chassis, the video display system, the third access port on the exterior side surface of the video monitor chassis and the third cable.

In accordance with various further aspects of this embodiment of the invention, the computer may include a printer, speaker system, telephone and USB device. A fourth cable would connect a fourth access port on the exterior side surface of the video monitor system to the printer; a fifth cable would connect a fifth access port on the exterior side surface of the video monitor to the speaker system, a sixth cable would connect a sixth access port on the exterior side surface of the video monitor to the telephone; and a seventh cable would connect a seventh access port on the exterior side surface of the video monitor to the USB device. The computing system would exchange printer data with the printer via the first cable, the video display system and the fourth cable, speaker data with the speakers via the first cable, the video display system and the fifth cable, telephone data with the telephone via the first cable, the video display system and the sixth cable and USB data with the USB device via the first cable, the video display system and the seventh cable.

In accordance with an alternate aspect of this embodiment of the invention, the computer includes a first interface board, supportably mounted within the computer chassis, for combining video and data signals generated by the computing system and propagated to the first interface board along a first input/output line thereof into a combined video/data signal for propagation to the video display system via a second input/output line thereof, the access port on the exterior side surface of the computer chassis, the first cable and the first access port on the exterior side surface of the video monitor chassis. In a further aspect of this embodiment of the invention, the video display system includes video display circuitry and a second interface board, both of which are supportably mounted within the video monitor chassis. The second interface board separates the combined video/data signal received via a first input/output line thereof into a video signal for propagation to the video display circuitry via an output line, keyboard data for propagation to the keyboard via a second input/output line, the second access port on the exterior side surface of the video monitor chassis and the second cable, and mouse data for propagation to the mouse via a third input/output line, the third access port on the exterior side surface of the video monitor chassis and the third cable.

In accordance with various further aspects of this alternate aspect of this embodiment of the invention, the computer may again include a printer, speaker system, telephone and USB device. A fourth cable would connect a fourth access port on the exterior side surface of the video monitor chassis to the printer; a fifth cable would connect a fifth access port on the exterior side surface of the video monitor chassis to the speaker system, a sixth cable would connect a sixth access port on the exterior side surface of the video monitor chassis to the telephone and a seventh cable would connect a seventh access port on the exterior side surface of the video monitor chassis to the USB device. The second interface board would separate printer data from the combined video/data signal for propagation to the printer via a fourth output line of the interface board, the fourth access port on the exterior side surface of the video monitor chassis and the fourth cable; would separate speaker data from the combined video/data signal for propagation to the speaker system via a fifth output line of the interface board, the fifth access port on the exterior side surface of the video monitor chassis and the fifth cable; would separate telephone data from the combined video/data signal data for propagation to the telephone via a sixth output line of the interface board, the sixth access port on the exterior side surface of the video monitor chassis and the sixth cable; and would separate USB data from the combined video/data signal for propagation to the USB device via a seventh output line of the interface board, the seventh access port on the exterior side surface of the video monitor chassis and the seventh cable.

DETAILED DESCRIPTION

Figure 1A:
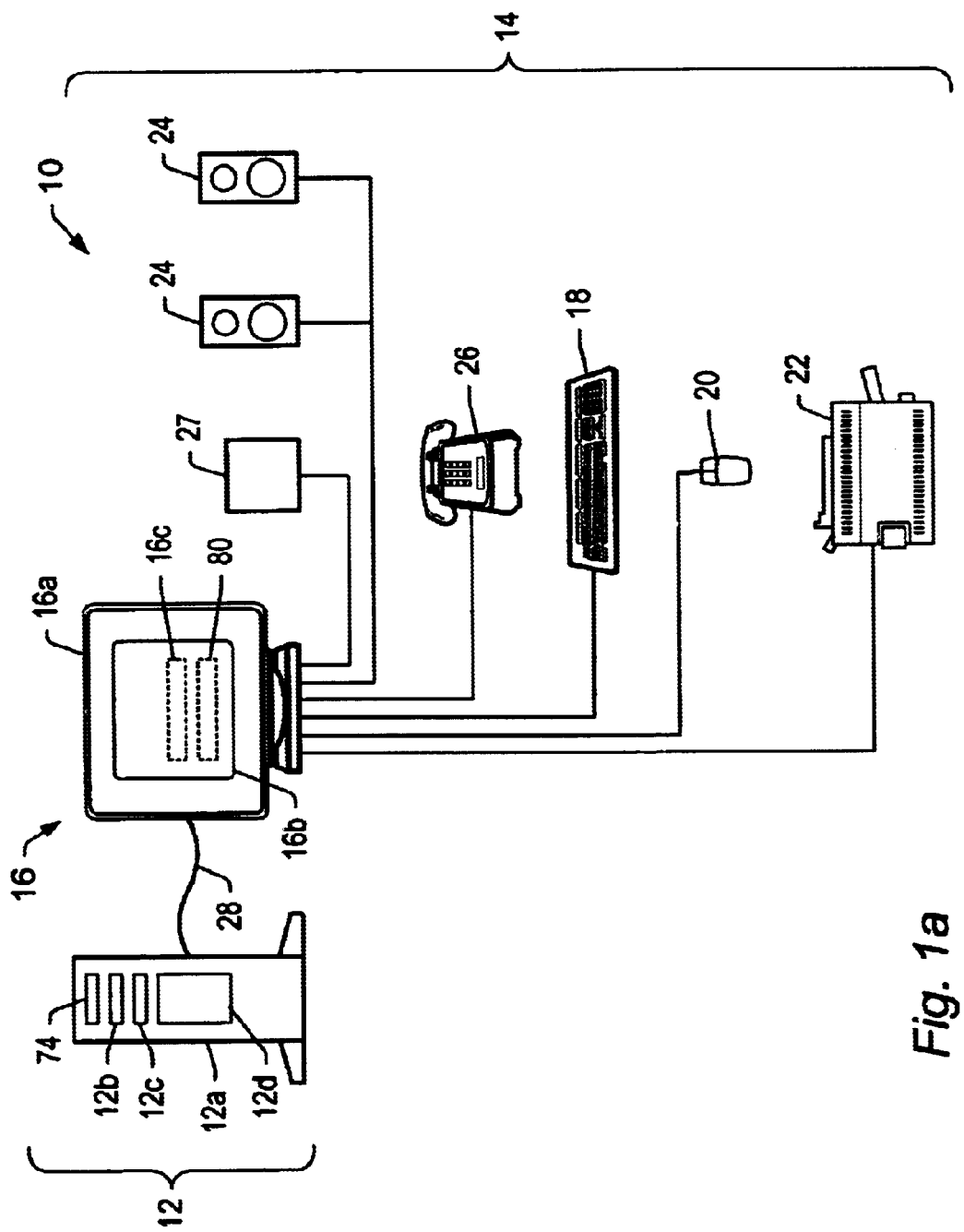
FIG. 1a is a front end view of a computer system constructed in accordance with the teachings of the present invention and characterized by the use of a single cable between computing system and human interface portions thereof.

Referring now to FIG. 1a, a computer system 10 constructed in accordance with the teachings of the present invention and characterized by reduced cabling requirements over conventionally configured computer systems achieved by the use of a single cable coupling computing system 12 and human interface 14 portions of the computer system 10 will now be described in greater detail. As may now be seen, the computer system 10 includes a computing system 12 coupled to a human interface 14. As illustrated herein, the computing system 12 is simply a computer chassis 12a, sometimes referred to as the "box" in which a processor board 12b, disk drive 12c, hard drive 12d, power supply (not shown) and other conventional components, are housed. Also housed within the computer chassis 12a is an interface board 74 to be more fully described below. Each of the processor board 12b, disk drive 12c, hard drive 12d and interface board 74 are supportably mounted within the computer chassis 12 by a conventional support structure which may include mounting slots, grooves, posts, resilient support clips, screws or the like. As illustrated in FIG. 1a, the computing system 12 is a mini-tower, a common PC configuration. However, it is specifically contemplated that the computing system 12 may be configured as a desktop model, which typically has less computing power than a mini-tower, a server, which typically has more computing power than a mini-tower, or any other type of commercially available computer.

As further illustrated in FIG. 1a, the human interface 14 is comprised of a video monitor 16, a keyboard 18, a mouse 20, a printer 22, speaker system 24, a telephone 26 and a USB device 27. The video monitor 16 is comprised of a chassis 16a in which a video display 16b is supportably mounted. Also supportably mounted within the chassis 16a (and shown in phantom in FIG. 1a), again, for example, by mounting slots, grooves, posts, resilient support clips, screws or other conventional support structure, are a display circuit 16b and an interface board 80, both of which will be more fully described below. The USB device 27 may be any type of USB enabled device commercially available such as a digital camera or a scanner which would form part of the human interface 14. It should be clearly understood that the disclosed human interface 14 is given by way of example. Accordingly, it is fully contemplated that other input/output (or "I/O") devices, for example, a joystick, trackball, touchpad or other device may be included as part of the human interface 14. Generally, for inclusion in the human interface 14, an I/O device should require, at a minimum, some type of physical interaction with a human during the operation thereof which provides data to, or receives data from, the computing system 12.

In a conventionally configured computer system, devices such as the video monitor, the keyboard, the mouse, the printer, the speaker system and the telephone which make up part of the human interface would each be provided with a respective cable which terminates in a connector which, when inserted into a corresponding matching connector provided on a rear side surface, or "backplane", of the computing system, would respectively couple internally located electronic components of the video monitor, the keyboard, the mouse, the printer, the speaker system and the telephone to a bus (not shown) within the computing system. As a separate cable is used to couple each device forming part of the human interface to the computing system, it should be readily appreciated that coupling the human interface relative to the computing system would prove to be an expensive and time consuming task, particularly when it is desired to remotely locate the human interface relative to the computing system.

Unlike a conventionally configured computer system, however, and in accordance with the teachings of the present invention, a single cable 28 is used to transport data between the computing system 12 and the human interface 14. The cable 28 is coupled, on a first end, to the computing system 12 and, on a second end, to the video monitor 16 of the human interface 14. The remaining devices forming part of the human interface 14 (the keyboard 18, the mouse 20, the printer 22, the speakers 24, the telephone 26 and the USB device 27) are then connected, in turn, to the video monitor 16. Because all of the data signals are consolidated onto the cable 28 for transport between the computing system 12 and the video monitor 16 of the human interface 14, cabling requirements for the computer system 10 are simplified considerably, particularly in those configurations where the human interface 14 is remotely located relative to the computing system 12. In alternate embodiments thereof, the cable 28 connecting the computing system 12 to the video monitor 16 can be either a collection of individual signal paths in a common jacket or an electronic consolidation of signals, for example, the consolidation of signals disclosed in our copending U.S. patent application Ser. No. 09/072, 320 filed May 4, 1998, entitled "Computer System Having Remotely Located I/O Devices", assigned to the Assignee of the present application and hereby incorporated by reference as if reproduced in its entirety, where digital data to be exchanged between the computing system and various devices, for example, the keyboard, mouse and/or printer, are injected into the video stream being propagated from the computing system to the video monitor.

Figure 1B:
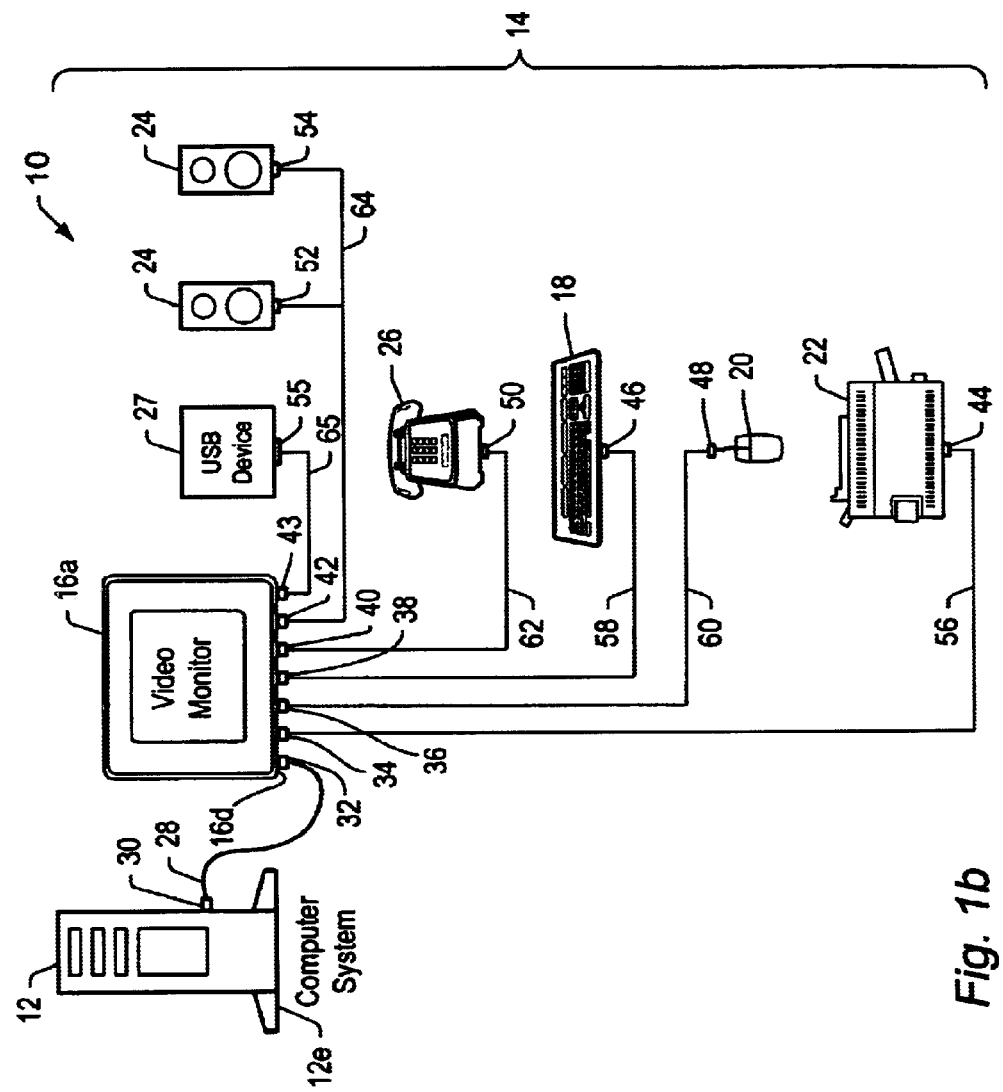
FIG. 1b is a block diagram of the computer system of FIG. 1a which illustrates the interconnection of the computing system and plural devices which collective comprise the human interface.

Referring next to FIG. 1b, the interconnection of the computing system 12 and the human interface 14 will now be described in greater detail. As may now be seen, on backplane 12e of the computing system 12 is a single connection port 30 which insertably receives a first connector (not shown) formed on a first end of the cable 28. On backplane 16d of the video monitor 16 are first, second, third, fourth, fifth, sixth and seventh connection ports 32, 34, 36, 38, 40, 42 and 43. A second connector (also not shown) formed on a second end of the cable 28 is inserted into the first monitor connection port 32 on the backplane 16d of the video monitor 16. Printer cable 56 couples the second monitor connection port 32 to a connection port 44 of the printer 22. Keyboard cable 58 couples the third monitor connection port 36 to a connection port 46 of the keyboard 18. Mouse cable 60 couples the fourth monitor connection port 38 to a connection port 48 of the mouse 20. Phone cable 62 couples the fifth monitor connection port 40 to a connection port 50 of the telephone 26. Speaker cable 64 couples the sixth monitor connection port 42 to the speakers 24. Finally, USB cable 65 couples the seventh monitor connection port 43 to a connection port 55 of the USB device 25. Of course while the keyboard 18, mouse 20, printer 22, speakers 24, telephone 26 and USB device 27 are all described as having a connection port in which a connector of the corresponding cable 56, 58, 60, 62, 64 and 64 may be respectively inserted, it should be noted that many of such devices, most notably keyboards and mouses, have the corresponding cable extend into the housing thereof where it is securely coupled to electronic components residing therein.

While the benefits of a human interface having a single cable which couples the human interface to the computing system will be readily appreciated by users of computers configured to have even relatively short distances, typically, distances less than 10 feet, separating the computing system and the human interface, the advantages are often most appreciated by users of computer systems in which the computing system and the human interface be located in separate rooms (or spaced considerable distance apart with a single, large room), which typically requires a minimum separation of at least 10 feet. It is specifically contemplated, however, that, in various configurations thereof, the computing system 12 and the human interface 14 may be located 10 or less feet apart, hundreds of feet apart, or even thousands of feet apart. In one specific configuration thereof, however, the human interface 14 is remotely located relative to the computing system 12. In this configuration, the term "remotely located" is intended to refer to separation distances greater than those possible using conventionally designed cables such as those provided when purchasing a PC. Accordingly, the term "remotely located", as used herein, generally refers to separation distances between 10 and 1,000 feet. However, as it is possible to utilize the disclosed techniques to separate the computing system 12 and the human interface 14 by distances greater than 1,000 feet, it should be clearly understood that the aforementioned upper limit of 1,000 feet is given purely by way of example and should not be construed as a limitation of the scope of the present invention.

The cable 28 may be configured in various fashions. As previously mentioned, in one configuration of the invention, the cable 28 may be a 4-wire cable such as that disclosed in co-pending U.S. patent application Ser. No. 09/072,320 and more fully described in co-pending U.S. patent application Ser. No. 08/674,626 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety. In a second, alternate configuration of the invention, the cable 28 may be a 6-wire cable to be more fully described below or another N-wire cable where N is a multiple of 2. In a 4-wire cable, three combined video or combined video/data signals produced from red (or "R"), green (or "G"), blue (or "B"), horizontal synchronization (or "HSYNC"), vertical synchronization (or "VSYNC") and data (or "DATA_TX") signals are carried over four conductors. More specifically, the computing system 12 places combined video signal (R+HSYNC)+ and combined video/data signal (G+DATA_TX)+ on a first conductor, combined video signal (R+HSYNC)− and combined video/data signal (G+DATA_TX)+ on a second conductor, combined video signal (B+VSYNC)+ and combined video/data signal (G+DATA_TX)− on a third conductor and combined video signal (B+VSYNC− and combined video/data signal (G+DATA_TX− on a fourth conductor of the 4-wire cable 28 for balanced mode transmission to the video monitor 16.

While the 4-wire cable is particularly advantageous in that the absolute minimum number of wires are used to propagate the combined video and combined video/data signals to their destination, oftentimes, additional conductors are available for use. For example, 6-wire cables are often used as the cable 28. In a 6-wire cable, three combined video or combined video/data signals produced from the R, G, B, HSYNC, VSYNC and DATA signals are carried over six conductors. More specifically, the computing system 12 places combined video signal (R+HSYNC)+ on a first conductor, combined video signal (R+HSYNC− on a second conductor, combined video signal (B+VSYNC)+ on a third conductor, combined video signal (B+VSYNC− on a fourth conductor, combined video/data signal (G+DATA)+ on a fifth conductor and combined video/data signal (G+DATA− on a sixth conductor of the 6-wire cable 28 for balanced mode transmission to the video monitor 16. Of course, any number of additional signals may also be transported over the cable 28 by placing any such additional signal on another pair of wires included as part of the cable 28.

Figure 2A:
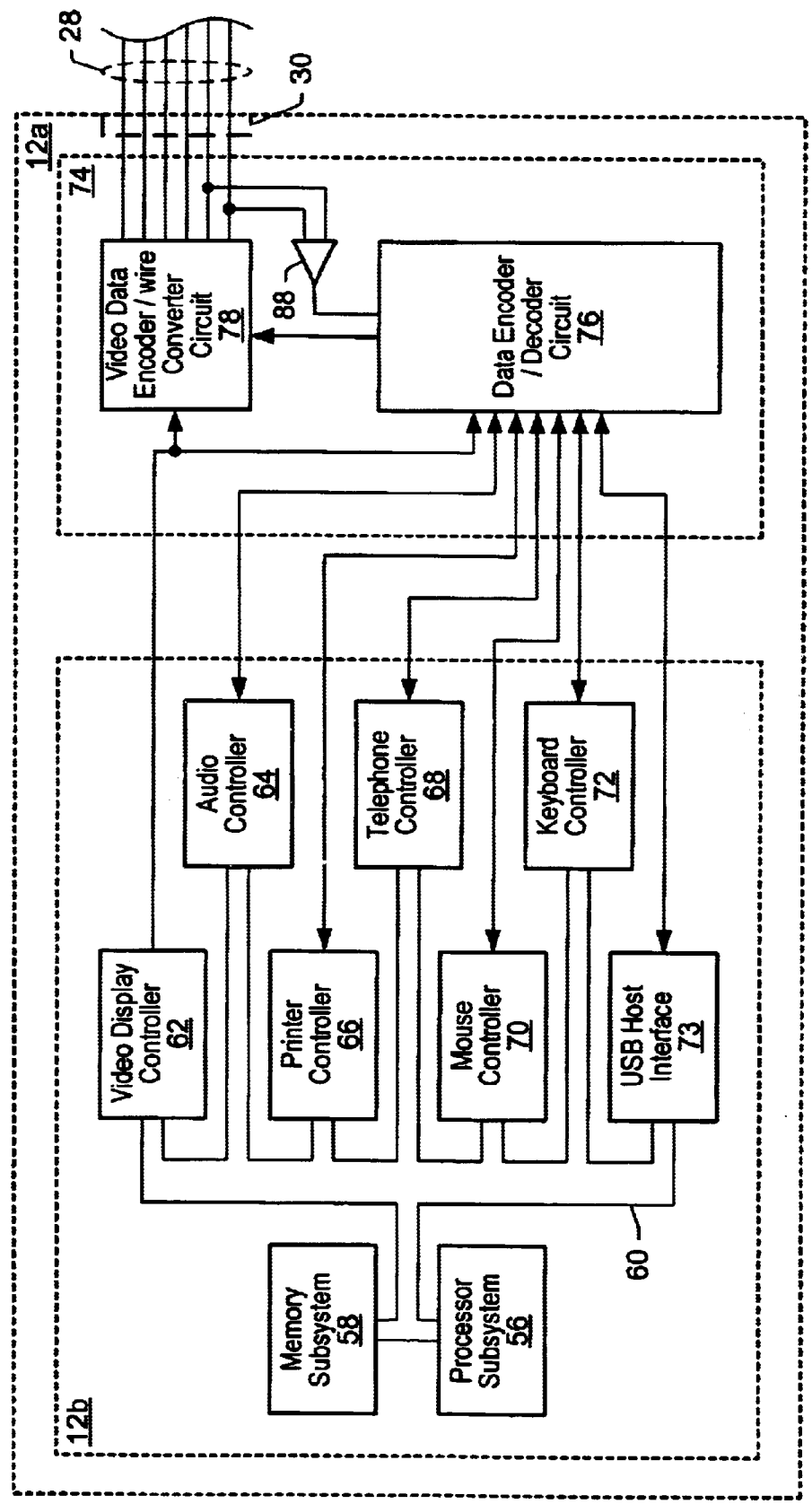
FIG. 2a is a block diagram of the computing system portion of the computer system of FIGS. 1a–b.

Referring next to FIG. 2a, the computing system 12 will now be described in greater detail. As previously set forth, the computing system 12 includes a chassis 12a within which various energy-demanding electrical components are supportably mounted. Of these, the processor board 12b is the main circuit board of the computing system 12. Residing on the processor board 12b are a processor subsystem 56, for example, a microprocessor, and a memory subsystem 58 coupled together by a bi-directional address, data and control bus 60. It should be clearly understood that FIG. 2a is a highly simplified representation of the components of the processor board 12b and that various components thereof have been omitted or combined for ease of description. For example, the memory subsystem 58 represents the total addressable memory space on the processor board 12b and includes the main memory, cache memory and any local memory device residing on the processor board 12b. Similarly, bus 60 is intended to encompass the various buses which interconnect the illustrated components, including the main system bus, the local bus on which the processor subsystem 58 resides and the various expansion buses used to couple peripheral devices and other components to the processor board 12b including, but not limited to, the industry standard architecture (or "ISA") bus and the peripheral connection interface (or "PCI") bus. Finally, except as described below, the bus 60 further encompasses all of the various bridges and supporting components that couple the various buses together.

Coupled to the bus 60 are a series of controllers which includes a video display controller 62, an audio controller 64, a printer controller 66, a telephone controller 68, a mouse controller 70 and a keyboard controller 72. The video display controller 62, the audio controller 64, the printer controller 66, the telephone controller 68, the mouse controller 70 and the keyboard controller 72 control the operation of the video monitor 16, the speakers 24, the printer 22, the telephone 26, the mouse 20 and the keyboard 18, respectively, by handling exchanges between those devices and the processor subsystem 56. To do so, the video display, audio, printer, telephone mouse and keyboard controllers 62, 64, 66, 68, 70 and 72 typically contain the device specific information needed by the processor subsystem 56 to interact with the video monitor 16, the speakers 24, the printer 22, the telephone 26, the mouse 20 and the keyboard 18, respectively, for example, when executing a software program which necessitates the transfer of data or control signals therebetween. It is contemplated that the video display, audio, printer, telephone, mouse and keyboard controllers 62, 65, 66, 68, 70 and 72 may be implemented in hardware, software or a combination thereof. If fully or partially implemented in software, the controllers 62 through 72 (or that portion thereof implemented in software) would be referred to as drivers.

It should be noted that the device identified in FIG. 2a as the telephone controller 68 is fairly dissimilar from the other controllers. More specifically, while the telephone controller 68 acts as an interface between the processor subsystem 58 and the telephone 26, the telephone controller further acts as an interface between the processor subsystem 58 and the PSTN (not shown in FIG. 2a) and as an interface between the telephone 26 and the PSTN. For example, the telephone controller 68 may selectively seize the connection to the PSTN for an application being executed by the processor subsystem 58, seize the connection to the PSTN for the telephone 26 when the telephone 26 goes off-hook, direct an incoming request for connection originating on the PSTN to the processor subsystem 58 for handling, or direct an incoming request for connection originating on the PSTN to the telephone 26 for handling.

While technically part of the PCI-to-ISA bridge, FIG. 2a further shows USB host interface 73. The USB host interface 73 handles exchanges between the processor subsystem 56 and the USB device 27 using the USB bus protocol. Briefly, a host controller (included as part of the USB host interface) sends a token packet, which describes the type and direction of a data transmission. The source of the data transmission then sends a data packet to a destination and, in response thereto, the destination responds with a handshake packet which indicates whether the transfer was successful.

In a conventionally configured computer system, the controllers 62 through 72 and the USB host interface 73 residing on the processor board 12b would be coupled to corresponding connectors provided on the backplane 12e of the computer system 12. In accordance with the teachings of the present invention, however, the controllers 62 through 72 are coupled to an interface board 74 which, like the processor board 12b, is supportably mounted inside the chassis 12a. In one embodiment, the interface board 74 is hardwired to the controllers 62 through 72 and the USB host interface 73 as schematically illustrated in FIG. 2a. Alternately, the interface board 74 may have a series of contacts (not shown) located along an edge side surface thereof which may be inserted, or "plugged", into an edge connector (also not shown) on the processor board 12b to which all of the controllers 62 through 72 and the USB host interface 73 are coupled.

Residing on the interface board 74 is a data encoder/decoder circuit 76 and a video data encoder/wire converter circuit 78. The configuration of both of these circuits are disclosed at length in the aforementioned co-pending U.S. patent application Ser. No. 09/072,320. Thus, while a full description of these devices is not deemed necessary, a brief description shall aid in the understanding of the present invention. Briefly, the video-data encoder/wire converter circuit 78 receives video signals output by the computing system 12 for transmission to the video monitor 16, specifically, the R, G, B, HSYNC and VSYNC signals. The data encoder/decoder circuit 76, on the other hand, receives all non-video data signals output by the computing system 12 for transmission to the keyboard 18, the mouse 20, the printer 25 22, the speakers 24, the telephone 26 and the USB device 27, respectively. The data encoder/decoder circuit 76 also receives the HSYNC and VSYNC signals from the computing system 12 and uses the HSYNC and VSYNC signals to encode plural data signals received from the computing system 12 into a combined data signal DATA_TX for transmission to the video-data encoder/wire converter 78.

Operation of the data encoder/decoder circuit 32 in producing the data signal DATA_TX will now be described in greater detail. As is well known in the art, the computing system 12 generates signals to be transmitted to various ones of the I/O devices included as part of the human interface 14 and various ones of the I/O devices 16, 18, 20, 22, 24, 26 and 27 included as part of the human interface 14 generates signals to be transmitted to the computing system 12. To fully encompass all embodiments of the invention, the interconnection between the computing system 12 and the various I/O devices included as part of the human interface 14 is bi-directional for all of the devices, even though for some of the devices, most notably the speakers 24, are predominately used in unidirectional operations only. However, it should be readily appreciated that software applications and devices which require bi-directional operations for such devices may have been developed or are in development. For ease of description, all of the signals generated by the computing system 12 for respective propagation to the keyboard 18, the mouse 20, the printer 22, the speakers 24 and the telephone 26 will be collectively referred to as KEYBOARD_OUT, MOUSE_OUT, PRINTER_OUT, AUDIO_OUT, TELEPHONE_OUT and USB_OUT, respectively, while all of the signals generated by the keyboard 18, the mouse 20, the printer 22, the speakers 24 and the telephone 26 for propagation to the computing system will be collectively referred to as KEYBOARD_IN, MOUSE_IN, PRINTER_IN, AUDIO_IN, TELEPHONE_IN and USB_IN, even though plural signals may be generated for transmission between the computing system 12 to and/or from various ones of the I/O devices 16, 18, 20, 22, 24, 26 and 27 forming part of the human interface 14 over respective lines. For example, the transmission lines between the computing system and the mouse 20 include MouseIn, a line that carries data from the mouse 20 to the computing system 12, MousePW+, a line which carries positive power from the computing system 12 to the mouse 20, MouseRset, a signal from the computing system 12 which instructs the mouse 20 to send a packet of data which identifies the manufacturer of the mouse 20 to the computing system 12 and MousePW-, a line which carries negative power from the computing system 12 to the mouse 20.

Each of the output signals KEYBOARD_OUT, MOUSE_OUT, PRINTER_OUT, AUDIO_OUT and TELEPHONE_OUT generated by the computing system 12 are propagated to a respective buffer (not shown) on the data encoder/decoder circuit 76 where the received data is held temporarily. The buffers 76 each include an output tied to a respective input of a 6:1 multiplexer (also not shown), the output of which is the combined data signal DATA_TX. The buffers and the multiplexer are controlled by control circuitry (also not shown). Using the HSYNC and VSYNC signals input the data encoder/decoder circuit 76, the control circuitry times the propagation of the digital data contained in the buffers such that the combined data signal DATA_TX produced thereby contains data only during the horizontal and vertical blanking pulses of the video signal being transmitted to the video-date encoder/wire converter circuit 78. To do so, the control circuitry receives the HSYNC and VSYNC signals from the video display controller 62 and counts the blanking pulses contained in the HSYNC and VSYNC signals. During each such blanking pulse of the HSYNC and VSYNC signals, the control circuitry enables a selected one of the buffers and the multiplexer such that the data stored in the selected buffer is propagated to the video-data encoder/wire converter circuit78 as part of the combined data signal DATA_TX. For example, in Ser. No. 09/072,216 filed May 4, 1998 entitled "Computer Network having Multiple Remotely Located Human Interfaces Sharing a Common Computing System" assigned to the Assignee of the present application and hereby incorporated by reference as if reproduced in its entirety, a data encoder/decoder circuit which combined KEYBOARD_OUT and MOUSE_OUT data signals into a combined data signal DATA_TX in which pulse counts 0–9 provide a guard area prior to injection of digital data into the stream of video information. Pulse counts 10–73 lines were reserved for digital data traveling from the processor subsystem 56 to the human interface 14, pulse counts 74–79 provide a guard area separating processor subsystem 56-to-human interface 14 data transmissions and human interface 14-to-processor subsystem 56 data transmissions, and upstream data pulse counts 80–143 were reserved for digital data traveling from the human interface 14 to the processor subsystem 56. Of these, pulse counts 10–12 were reserved for mouse set-up information, pulse counts 13–32 were reserved for mouse data, pulse counts 33–34 were reserved for testing, pulse counts 35–61 were reserved for future use, pulse counts 52–63 were reserved for keyboard data, pulse counts 80–82 were reserved to carry mouse set-up information, pulse counts 83–102 were reserved for carrying mouse data, pulse counts 103–104 were reserved for testing, pulse counts 105–131 are reserved for future uses and pulse counts 132–143 were allocated for carrying keyboard data. In the present application, the remaining unassigned pulse counts (140–480) may be assigned to data transmissions for the remaining I/O devices (the printer 22, the speakers 24, the telephone 26 and the USB device 27) not disclosed in the aforementioned co-pending U.S. patent application Ser. No. 09/072,216.

It should be noted that some I/O devices, for example, the mouse 20, may have multiple output lines instead of the single output line illustrated in FIG. 2a. For such I/O devices, it is contemplated that the data encoder/decoder circuit 76 should be provided with additional circuitry, specifically, an additional multiplexer and associated control circuitry for each such multiple output line I/O device. The additional multiplexer would combine all of the multiple output signals for an I/O device into a combined output signal. In turn, the combined output signal would be an input to the aforementioned 6:1 multiplexer.

The combined DATA_TX signal is transmitted to the video-data encoder/wire converter circuit 78. As before, the video data encoder/wire converter circuit 78 was described and illustrated in detail in the aforementioned co-pending U.S. patent application Ser. No. 09/072,320. Input to the encoder circuit are the R, G, B, HSYNC, VSYNC video signals and the combined data signal DATA_TX. Within a video data encoder circuit portion of the video data encoder/wire converter circuit 78, the R and HSYNC video signals are combined into a first combined video signal R+HSYNC, the B and VSYNC video signals are combined into a second combined video signal B+VSYNC and the G video and DATA_TX data signals are combined into a third combined video/data signal G+DATA_TX.

The R+HSYNC, B+VSYNC and G+DATA signals output the video data encoder portion of the video data encoder/wire converter circuit 78 are transmitted to a wire converter circuit portion of the video data encoder/wire converter circuit 78 where the three signals are placed on lines 1–6 of the 6-wire cable 28 for balanced mode transmission to the human interface 14. Balanced mode transmission of 3 signals over 6 wires is common in the art and need not be described in further detail. Briefly, however, combined video signal (R+HSYNC)+ would be placed on line 1, the combined video signal (R+HSYNC− on line 2, the combined video/data signal (G+DATA)+ on line 3, the combined video/data signal (G+DATA)+ on line 4, the combined video signal (B+VSYNC)+ on line 5 and the combined video signal (B+VSYNC− on line 6 of the 6-wire cable 28. Alternately, a 3-to-4 wire converter 40 as described in the aforementioned co-pending U.S. patent application Serial No. 08/674,626 may be used instead. Specifically, the combined video signal (R+HSYNC)+ and the combined video/data signal (G+DATA)+ are placed on line 1, the combined video signal (R+HSYNC− and the combined video/data signal (G+DATA)+ are placed on line 2, the combined video signal (B+VSYNC)+ and the combined video/data signal (G+DATA− are placed on line 3 and the combined video signal (B+VSYNC− and the combined video/data signal (G+DATA− are placed on line 4 of the 4-wire cable 28 for balanced mode transmission to the human interface 14.

From the video data encoder/wire converter circuit 78 on the interface board 74, the (R+HSYNC)+, (R+HSYNC)−, (G+DATA)+, (G+DATA)+, (B+VSYNC)+ and (B+VSYNC− are propagated to the video monitor via connector 30, cable 28 and the connector 32. From the connector 32, the signals are propagated to an interface board 80 supportably mounted within the chassis 16a of the video monitor 16. The interface board 80 is comprised of a wire converter circuit/video decoder circuit 82 and a data decoder/encoder circuit 84. As before, the wire converter 82 is conventionally configured while the video data decoder and data decoder/encoder are described and illustrated in co-pending U.S. patent application Ser. No. 09/072,320. Accordingly, none of these elements need be described at great length.

Briefly, however, the wire converter circuit portion of the wire converter/video data encoder circuit 78 converts the signals transported over the cable 28 to their original form. Accordingly, the input to the wire converter circuit portion would be the (R+HSYNC)+, (R+HSYNC)−, (G+DATA)+, (G+DATA)+, (B+VSYNC)+ and (B+VSYNC− while the output of the wire converter circuit portion would be two combined video signals, R+HSYNC and B+VSYNC and one combined video/data signal G+DATA_TX. The R+HSYNC, B+VSYNC and G+DATA_TX signals are input the video data decoder circuit portion where they are separated into the R, G, B, HSYNC and VSYNC video signals and the DATA_TX combined data signal. From the output of the wire converter/video data decoder circuit 82, the R, G, B, HSYNC and VSYNC video signals are propagated to display circuitry 16c where the signals are used to generate a visible image on the video monitor 16b in a conventional fashion. The HSYNC and VSYNC video signals are also propagated, together with the DATA_TX combined data signal, to the data decoder/encoder circuit 84 where the DATA_TX signal is separated into KEYBOARD_OUT, MOUSE_OUT, PRINTER_OUT, SPEAKERS_OUT, TELEPHONE_OUT and USB DEVICE_OUT data signals for respective propagation to the keyboard 18, the mouse 20, the printer 22, the speakers 24, the telephone 26 and the USB device 27 via the connection port 34 and the cable 58, the connection port 36 and the cable 60, the connection port 38 and the cable 56, the connection port 40 and the cable 64, the connection port 42 and the cable 62, and the connection port 43 and the cable 65, respectively.

Figure 2B:
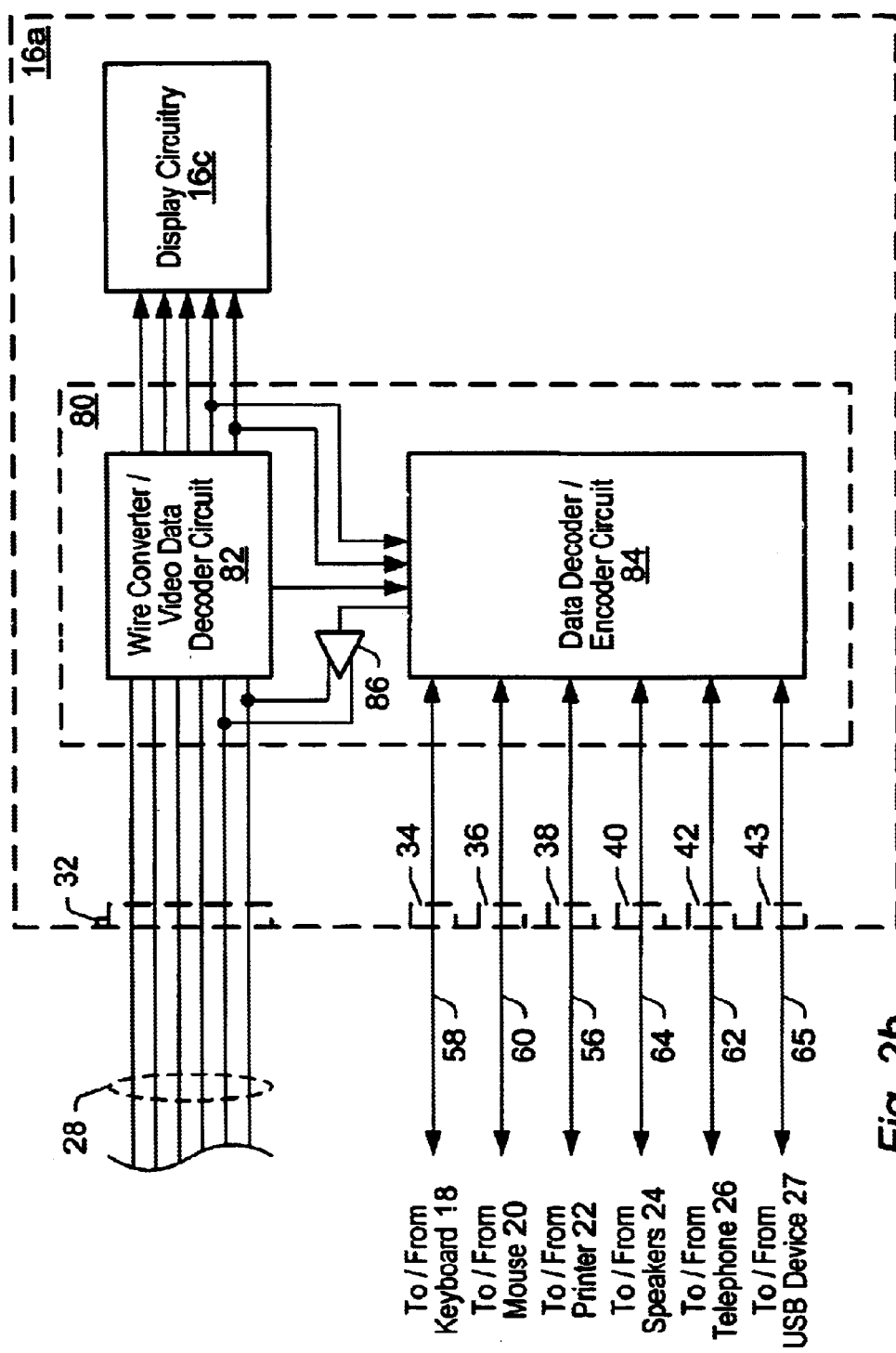
FIG. 2b is a block diagram of a video monitor device of the human interface of FIGS. 1a–b.

Heretofore, only the transmission of signals from the computing system 12 to the keyboard 18, the mouse 20, the printer 22, the speakers 24, the telephone 26 and the USB device 27, which-collectively are the I/O devices forming part of the human interface 14, have been described. As it is typically preferred that computer systems are configured for bi-directional exchanges between the computing system 12 and the aforementioned I/O devices, it is desired that the computer system 10 disclosed herein enable the transmission of signals from the keyboard 18, the mouse 20, the printer 22, the speakers 24, the telephone 26 and the USB device 27 to the computing system 12. Such a further enablement of the invention shall now be described in greater detail, again by referring to FIGS. 2a and 2b.

Signals output by the keyboard 18, the mouse 20 and the printer 22, speakers 24, telephone 26 and USB device 27 are respectively transmitted along the KEYBOARD_IN, MOUSE_IN and PRINTER_IN lines to the data decoder/encoder circuit 84 were there are combined into a combined data signal DATA_RX in a manner similar to that used to generate combined data signal DATA_TX. Rather than directing the DATA_RX signal to the video data encoder/wire converter 78, the DATA_RX signal is directed to a transmitter 86 which splits the DATA_RX line into two identical signals and directly injects the signal on each of lines 5 and 6 of the 6-wire cable 28 in differential mode. As the DATA_RX signal can only go high during the horizontal and/or vertical blanking pulses, data may be bi-directionally transferred between the computing system 12 and the I/O devices without interfering with the video signal being transferred from the computing system 12 to the video monitor 16.

As previously stated, the transmitter 76 places DATA_RX on both lines 5 and 6 of the 6-wire cable 28. Lines 5 and 6 are further coupled to inputs of receiver 88 which provides, as its output, the combined data signal DATA_RX. The data encoder/decoder circuit receives the DATA_RX combined data signal from the receiver 88 and, in a manner similar to the separation of the DATA_TX signal within the data decoder/encoder circuit 84, separates the combined data signal DATA_RX into SPEAKERS_IN, PRINTER_IN, TELEPHONE_IN, MOUSE_IN, KEYBOARD_IN and USB DEVICE_IN data signals for respective propagation to the audio controller 64, the printer controller 66, the telephone controller 68, the mouse controller 70, the keyboard controller 72 and the USB host interface 73.

By configuring the computer system 10 in the manner disclosed herein, all of the cabling for the various devices forming part of the human interface 14 is 7c consolidated into a single, easy to use and install cable/connector assembly which extends between the computing system 12 and the video monitor 16. As a result, a highly simplified cabling design which is particularly advantageous when all of the I/O devices 16, 18, 20, 22, 24, 26 and 27 forming part of the human interface 14 are to be assembled in a single location remote from the computing system 12.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer, comprising:
a computing system;
a human interface for said computing system, said human interface comprised of a video monitor and a first I/O device;
a first cable, said first cable coupling said video monitor to said computing system; and
a second cable, said second cable coupling said first I/O device to said video monitor;
wherein said computing system propagates data for said first I/O device to said video monitor over said first cable, and said video monitor propagates said data for said first I/O device received over said first cable to said first I/O device over said second cable; and
wherein said computing system propagates video display signals for display by said video monitor to said video monitor over said first cable.

2. A computer according to claim 1, wherein said computer further comprises:
a first interface board having at least two lines connected to said computing system and at least one line connected to said first cable;
said first interface board receiving a video signal from said computing system over a first one of said at least two lines and receiving a data signal from said computing system over a second one of said at least two lines;
said first interface board including a circuit for combining said video signal and said data signal into a combined video/data signal;
wherein said first interface board propagates said combined video/data signal to said video monitor over said first cable.

3. A computer according to claim 2, wherein said video monitor comprises:
a display circuit;
a second interface board having at least one line connected to said first cable, at least one line connected to said display circuit and at least one line connected to said second cable;
said second interface board receiving said combined video/data signal from said first interface board over said first cable;
said second interface board including a circuit for separating said combined video/data signal into said video signal and said data signal;
wherein said second interface board propagates said video signal to said display circuit over said at least one line connected to said display circuit and propagates said data signal to said first I/O device over said at least one line connected to said second cable.

4. A computer according to claim 1,
wherein said human interface further comprises one or more additional I/O devices, wherein said first I/O device and said one or more additional I/O devices comprise a plurality of I/O devices;
wherein said computer further comprises:
one or more additional cables, wherein said second cable and said one or more additional cables comprise a plurality of cables, wherein each respective cable of said plurality of cables couples a respective I/O device of said plurality of I/O devices to said video monitor; and
a first interface board coupled to said first cable, wherein said first interface board comprises:
a first circuit, coupled to said computing system, wherein said first circuit is operable to:
receive a plurality of data signals from said computing system, wherein said plurality of data signals comprises a respective data signal for each of said plurality of I/O devices; and
combine said plurality of data signals into a combined data signal; and a second circuit, coupled to said computing system via a video signal line, wherein said second circuit is further coupled to said first circuit;

wherein said second circuit is operable to:
receive said video signal from said computing system over said video signal line;
receive said combined data signal from said first circuit;
combine said video signal and said combined data signal into a combined video/data signal; and
propagate said combined video/data signal to said video monitor over said first cable.

5. A computer according to claim 4, wherein said video monitor comprises:

a display circuit;

a second interface board, coupled to said display circuit via a display line, wherein said second interface board is further coupled to said first cable, wherein said second interface board is further coupled to each of said plurality of cables;

wherein said second interface board is operable to receive said combined video/data signal from said first interface board over said first cable;

wherein said second interface board comprises:
a third circuit, wherein said third circuit is operable to:
receive said combined video/data signal; and
separate said combined video/data signal into said video signal and said combined data signal; and
a fourth circuit coupled to said third circuit, wherein said fourth circuit is operable to:
receive said combined data signal from said third circuit; and
separate said combined data signal into said plurality of data signals;

wherein said second interface board is operable to:
propagate said video signal to said display circuit over said display line for display on said video monitor; and
propagate each respective data signal of said plurality of data signals to the respective I/O device of said plurality of I/O devices over the respective cable of said plurality of cables.

6. A computer, comprising:

a computer chassis having an access port on an exterior side surface thereof;

a video monitor chassis having first, second and third access ports on an exterior side surface thereof;

a computing system supportably mounted within said computer chassis, said computing system coupled to said access port on said exterior side surface of said computer chassis;

a video display system supportably mounted within said video monitor chassis, said video display system coupled to said first access port on said exterior side surface of said video monitor chassis;

a first cable connecting said access port on said exterior side surface of said computer chassis to said first access port on said exterior side surface of said video monitor chassis;

a keyboard;

a second cable connecting said second access port on said exterior side surface of said video monitor to said keyboard;

a mouse; and a third cable connecting said third access port on said exterior side surface of said video monitor to said mouse;

wherein said computing system and said keyboard exchange keyboard data via said first cable, said video display system, and said second cable;

wherein said computing system and said mouse exchange mouse data via said first cable, said video display system, and said third cable; and wherein said computing system sends video display signals via said first cable to said video display system for display by said video display system.

7. A computer according to claim 6 and further comprising:

a printer; and a fourth cable connecting a fourth access port on said exterior side surface of said video monitor system to said printer;

wherein said computing system and said printer exchange printer data via said first cable, said video display system and said fourth cable.

8. A computer according to claim 7 and further comprising:

a speaker system; and a fifth cable connecting a fifth access port on said exterior side surface of said video monitor to said speaker system;

wherein said computing system and said speaker system exchange speaker data via said first cable, said video display system and said fifth cable.

9. A computer according to claim 8 and further comprising:

a telephone; and a sixth cable connecting a sixth access port on said exterior side surface of said video monitor system to said telephone;

wherein said computing system and said telephone exchange telephone data via said first cable, said video display system and said sixth cable.

10. A computer according to claim 9 and further comprising:

a USB device; and a seventh cable connecting a seventh access port on said exterior side surface of said video monitor to said USB device;

wherein said computing system and said USB device exchange USB data via said first cable, said video display system and said seventh cable.

11. A computer according to claim 6 and further comprising:

a first interface board supportably mounted within said computer chassis, said first interface board having a first input/output line connected to said computing system and a second input/output line connected to said access port on said exterior side surface of said computer chassis;

said first interface board combining video and data signals generated by said computing system into a combined video/data signal for propagation to said video display system via said access port on said exterior side surface of said computer chassis, said first cable and said first access port on said exterior side surface of said video monitor chassis.

12. A computer according to claim 11, wherein said video display system further comprises:

video display circuitry supportably mounted within said video monitor chassis, said video display circuitry having an input line;

a second interface board supportably mounted within said video monitor chassis;

said second interface board having a first input/output line connected to said first access port on said exterior side surface of said video monitor chassis, a second input/output line connected to said second access port on said exterior side surface of said video monitor chassis, a third input/output line connected to said third access port on said exterior side surface of said video monitor chassis and an output line connected to said input line of said video display circuitry;

said second interface board separating said combined video/data signal into a video signal for propagation to said video display circuitry via said output line, keyboard data for propagation to said keyboard via said second input/output line, said second access port on said exterior side surface of said video monitor chassis and said second cable, and mouse data for propagation to said mouse via said third input/output line, said third access port on said exterior side surface of said video monitor chassis and said third cable.

13. A computer according to claim 12 and further comprising:

a printer; and a fourth cable connecting a fourth access port on said exterior side surface of said video monitor chassis to said printer;

said second interface board further separating, from said combined video/data signal, printer data for propagation to said printer via a fourth output line of said interface board, said fourth access port on said exterior side surface of said video monitor chassis and said fourth cable.

14. A computer according to claim 13 and further comprising:

a speaker system; and a fifth cable connecting a fifth access port on said exterior side surface of said video monitor chassis to said speaker system;

said second interface board further separating, from said combined video/data signal, speaker data for propagation to said speaker system via a fifth output line of said interface board, said fifth access port on said exterior side surface of said video monitor chassis and said fifth cable.

15. A computer according to claim 14 and further comprising:

a telephone; and a sixth cable connecting a sixth access port on said exterior side surface of said video monitor chassis to said telephone;

said second interface board further separating, from said combined video/data signal, telephone data for propagation to said telephone via a sixth output line of said interface board, said sixth access port on said exterior side surface of said video monitor chassis and said sixth cable.

16. A computer according to claim 15 and further comprising:

a USB device; and a seventh cable connecting a seventh access port on said exterior side surface of said video monitor chassis to said USB device;

said second interface board further separating, from said combined video/data signal, USB data for propagation to said USB device via a seventh output line of said interface board, said seventh access port on said exterior side surface of said video monitor chassis and said seventh cable.

17. A computer, comprising:

a computing system;

a human interface for said computing system, said human interface comprised of a video monitor and a first USB device;

a first cable, said first cable coupling said video monitor to said computing system; and a second cable, said second cable coupling said first USB device to said video monitor;

wherein said computing system propagates USB data for said first USB device to said video monitor over said first cable, and said video monitor propagates said USB data for said first USB device received over said first cable to said first USB device over said second cable; and wherein said computing system propagates video signals for display by said video monitor to said video monitor over said first cable.

18. A computer according to claim 17, wherein said computer further comprises:

a first interface board having at least two lines connected to said computing system and at least one line connected to said first cable;

said first interface board receiving a video signal from said computing system over a first one of at least two lines and receiving a USB signal from said computing system over a second one of said at least two lines;

said first interface board including a circuit for combining said video signal and said USB signal into a combined video/USB signal;

wherein said first interface board propagates said combined video/USB signal to said video monitor over said first cable.

19. A computer according to claim 18, wherein said video monitor comprises:

a display circuit;

a second interface board having at least one line connected to said first cable, at least one line connected to said display circuit, and at least one line connected to said second cable;

said second interface board receiving said combined video/USB signal from said first interface board over said first cable;

said second interface board including a circuit for separating said combined video/USB signal into said video signal and said USB signal;

wherein said second interface board propagates said video signal to said display circuit over said at least one line connected to said display circuit and propagates said USB signal to said first USB device over said at least one line connected to said second cable.

20. A computer according to claim 17, wherein said human interface further comprises one or more additional USB devices, wherein said first USB device and said one or more additional USB devices comprise a plurality of USB devices;

wherein said computer further comprises:
  one or more additional cables, wherein said second cable and said one or more additional cables comprise a plurality of cables, wherein each respective cable of said plurality of cables couples a respective USB device of said plurality of USB devices to said video monitor; and
  a first interface board coupled to said first cable, wherein said first interface board comprises:
    a first circuit, coupled to said computing system, wherein said first circuit is operable to:
      receive a plurality of USB signals from said computing system, wherein said plurality of USB signals comprises a respective USB signal for each of said plurality of USB devices; and
      combine said plurality of USB signals into a combined USB signal; and
    a second circuit, coupled to said computing system via a video signal line, wherein said second circuit is further coupled to said first circuit;
    wherein said second circuit is operable to:
      receive said video signal from said computing system over said video signal line;
      receive said combined USB signal from said first circuit;
      combine said video signal and said combined USB signal into a combined video/USB signal; and
      propagate said combined video/USB signal to said video monitor over said first cable.

21. A computer according to claim 20, wherein said video monitor comprises:

a display circuit;
a second interface board, coupled to said display circuit via a display line, wherein said second interface board is further coupled to said first cable, wherein said second interface board is further coupled to each of said plurality of cables;
wherein said second interface board is operable to receive said combined video/USB signal from said first interface board over said first cable;
wherein said second interface board comprises:
  a third circuit, wherein said third circuit is operable to:
    receive said combined video/USB signal; and
    (separate said combined video/USB signal into said video signal and said combined USB signal; and
  a fourth circuit coupled to said third circuit, wherein said fourth circuit is operable to:
    receive said combined USB signal from said third circuit; and
    separate said combined USB signal into said plurality of USB signals;
wherein said second interface board is operable to:
  propagate said video signal to said display circuit over said display line for display on said video monitor; and
  propagate each respective USB signal of said plurality of USB signals to the respective USB device of said plurality of USB devices over the respective cable of said plurality of cables.

* * * * *